(12) United States Patent
Vitalini

(10) Patent No.: US 8,727,103 B2
(45) Date of Patent: May 20, 2014

(54) TILT TRAY SORTER CONVEYOR

(75) Inventor: Michele Vitalini, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 390 days.

(21) Appl. No.: 13/055,519

(22) PCT Filed: Jul. 29, 2009

(86) PCT No.: PCT/EP2009/059783
§ 371 (c)(1),
(2), (4) Date: Jan. 24, 2011

(87) PCT Pub. No.: WO2010/012755
PCT Pub. Date: Feb. 4, 2010

(65) Prior Publication Data
US 2011/0114447 A1    May 19, 2011

(30) Foreign Application Priority Data

Jul. 30, 2008  (DE) .......................... 10 2008 035 690

(51) Int. Cl.
*B65G 47/96* (2006.01)
*B65G 47/38* (2006.01)

(52) U.S. Cl.
USPC ................. 198/568; 198/370.04; 198/370.03

(58) Field of Classification Search
None
See application file for complete search history.

(56) References Cited

U.S. PATENT DOCUMENTS

| | | | | |
|---|---|---|---|---|
| 2,792,031 A | * | 5/1957 | Batchelder | .................... 141/153 |
| 3,209,893 A | | 10/1965 | Trautwein | |
| 3,669,245 A | * | 6/1972 | Wooten et al. | ........... 198/370.04 |
| 6,502,687 B1 | * | 1/2003 | Ayen et al. | ............... 198/370.04 |
| 6,938,750 B2 | * | 9/2005 | Miller et al. | ............. 198/370.06 |

FOREIGN PATENT DOCUMENTS

| | | |
|---|---|---|
| CH | 678518 A5 | 9/1991 |
| DE | 1069530 B | 11/1959 |
| DE | 40 90 308 T5 | 9/1990 |
| EP | 0425021 A1 | 5/1991 |
| EP | 1411008 A1 | 4/2004 |
| WO | WO 0146045 A1 | 6/2001 |
| WO | WO 02057161 A2 | 7/2002 |

* cited by examiner

*Primary Examiner* — Kavel Singh

(57) ABSTRACT

A tilt tray sorter conveyor for piece goods is provided. The conveyer includes wagons which are coupled to each other to make a ring or train, or are employed individually, and are moved along rails, each wagon having a carrying tray. Each carrying tray is pivoted to both sides about a pivot which is arranged centrally underneath the carrying tray and runs in the direction of travel, by a tilt drive arranged on the wagon, from a horizontal transport position into an unloading position to release goods conveyed by the wagon. In order to enable a flexible operational discharge of the tiling movement of the carrying tray, at least one flexible form-fitting or force-fitting traction mechanism is arranged underneath the carrying tray and hinged to both sides, the traction mechanism working with a drive to apply a traction force to the carrying tray in the tilting direction.

16 Claims, 3 Drawing Sheets

TILT TRAY SORTER CONVEYOR

CROSS REFERENCE TO RELATED APPLICATIONS

This application is the US National Stage of International Application No. PCT/EP2009/059783 filed Jul. 29, 2009, and claims the benefit thereof. The International Application claims the benefits of German Application No. 10 2008 035 690.5 DE filed Jul. 30, 2008. All of the applications are incorporated by reference herein in their entirety.

FIELD OF INVENTION

The invention relates to a tilt tray sorter apparatus for piece goods, composed of wagons which are coupled to one another into a ring or train or are individual and are movable along running rails and which each have at least one carrying tray which is arranged thereon and which, for the discharge of conveyable stock transported so as to lie on the carrying tray, can be pivoted, by means of a tilting drive arranged on the wagon, out of a horizontal transport position, about a tilt axis running in the direction of travel and arranged centrally underneath the carrying tray, on both sides in each case into an unloading position.

BACKGROUND OF INVENTION

Tilt tray sorters, as they are known, have long been appropriate for the transport and separation of piece goods. The conveyable stock is in this case picked up by track-guided vehicles which on their top side have load carriers which are designed as carrying trays and are held horizontally for load transport and can be tilted for load shedding.

DE 40 90 308 T1 discloses a tilt tray conveyor of this type, in which tilting of the carrying trays is made possible by a cam follower roller connected to the tiltable carrying tray. Although the rollers slide in corresponding guides, the rollers are nevertheless subject to high resistance which exerts correspondingly high stress upon the mechanism. This solution can therefore be employed, at most, for smaller pieces of conveyable stock, the weight of which does not exceed a few kilograms. Moreover, the tilt tray conveyors of this type are highly complicated, since, in order to initiate the tilting movement of the carrying trays, complex levers and linkages are required which cooperate with likewise complex rails and guides along the route of the conveyor in the tilting region of the carrying trays. Furthermore, the tilt angle of the carrying trays is fixed invariably by the geometry of these mechanical components, and the tilting time point and tilting movement are fixed by the configuration of the mechanical guides next to the route of the conveyor.

It has also already been proposed to use an arrangement, travelling on the wagon, of a tilting drive in the form of an electric motor, which cooperates via a pinion with arcuate racks fastened to the frame of the wagon. The carrying tray is tilted as a result of the activation of the electric motor supported on the racks, with the result that the tilting lever, together with the carrying tray fastened to it, can be brought into the tilting position (EP 1 454 856 A1). By virtue of this arrangement, the tilting drive becomes independent of any guide rails, bends and control rollers along the route of the conveyor, and also of further mechanical linkages and levers, such as are known in the most diverse possible versions from the prior art.

Other existing tilt tray sorters have rigid activating mechanisms which are controlled both mechanically and electrically. The transmissions of movements take place via narrow-tolerance pairings or gearwheel mechanisms which demand complicated production methods or, in the event of faults, entail high risks of damage.

SUMMARY OF INVENTION

An object of the present invention is to develop a known tilt tray conveyor such that, along with a simplified and therefore cost-effective type of construction, a flexible initiation of the tilting movement of the carrying trays becomes possible.

To achieve the object, it is proposed that the tilting drive provided be at least one flexible nonpositive or positive traction means which is articulated on both sides of the tilt axis underneath the carrying tray and which is connected to a drive for applying a traction force acting in the tilting direction of the carrying tray. Contrary to previous solutions in which the tilting force was initiated mechanically via tappet or rack-and-pinion connections, according to the invention the tilting movement is achieved by flexible traction means which, because they have been articulated on the underside of the carrying tray, consequently draw the latter downward as soon as a traction force is applied to the traction means. The traction means is preferably guided from one articulation point on the underside of the carrying axis to a second articulation point, a drive being provided, around which the traction means is looped. This drive is arranged centrally underneath the carrying tray and, as a function of the activation and direction of rotation of the drive motor, selectively draws the traction means to one side or the other, depending on the side to which the carrying tray is to be tilted. In a refinement of the invention, there is provision whereby the traction means is connected positively to the drive and can be driven as chain or toothed belt via a chain wheel or gearwheel, the axis of rotation of which is oriented in the transport direction. If required, it is possible, within the scope of the invention, to provide a chain or toothed belt in duplicate, that is to say on both sides of the wagon, when the load to be transported and to be tilted is greater.

In a second variant of the invention, there is provision for connecting the traction means nonpositively to the drive and for guiding it as a belt around a pulley, the axis of rotation of which is likewise oriented in the transport direction. The traction means used, in the form of a chain or toothed belt or belt, are known, for example, from automobile technology and serves there for controlling the engine or for driving accessories.

The chain and toothed belt advantageously have no slip because they engage positively into a gearwheel or chain wheel, whereas, in the case of belt drives, care must be taken to ensure that the belts do not slip on the pulley. Yet even in this respect, solutions are known in the prior art, for example where the belts are designed in the form of V-belts which are deflected in V-belt pulleys.

Another especially beneficial solution of the present invention is characterized in that the nonpositive traction means used is a strap which has a width corresponding essentially to the width of the carrying tray, as seen in the transport direction, and which is guided underneath the carrying tray via a drive drum oriented with its axis of rotation in the transport direction and which is articulated at its ends on both sides, above the drive drum, on the underside of the carrying tray. This solution uses, instead of a chain wheel or toothed disk, a drive drum which extends over the width of the carrying tray and actuates the strap frictionally during, the rotation of the drive drum. The solution with the wide strap has the particular advantage that the strap closes the space underneath the carrying tray and thus reliably prevents parts of the piece goods from falling into the mechanism between the wagon and the tilting apparatus of the carrying tray and from causing damage there or being damaged themselves.

In order to increase frictional connection, particularly in the case of traction means used nonpositively, in a further refinement of the invention there is provision whereby the traction means is guided around deflecting rollers on both sides of the drive. These deflecting rollers make it possible to have a greater looping angle around the wheels or drum and consequently increase frictional connection for the take-up of the carrying tray.

In order to compensate for length differences of the belt strands between the position of rest, in which the carrying tray is in a horizontal position, and the position in which the carrying tray is tilted to the right or left, and in order to achieve a precalculated prestress of the system, it is proposed, according to the invention, that, between the deflecting rollers and the articulation of the traction means, tension rollers be provided, which are mounted resiliently in the resulting direction of action of the traction forces.

Alternatively, the deflecting rollers themselves may be designed as tension rollers.

Likewise with the aim of increasing the nonpositive connection between the drive and traction means, it is proposed, according to another feature of the invention, that the traction means be guided from one side of the carrying tray to the other side of the carrying tray in an S-shaped manner around the deflecting and drive rollers. According to the invention, the guidance of the nonpositive traction means is preferably selected such that a looping angle of the traction means around the drive of between 45° and 180° is maintained.

Preferably, it is proposed that the deflecting rollers be arranged at a lower level than the drive, so that the traction means can be guided around the drive with a large looping angle.

The invention provides for feeding the drive itself from an electric motor, although different drives may be used. Thus, the electric motor may be provided inside the drum when a strap is used as a tilting drive; in the case of gearwheels or pinions or pulleys, these may be arranged on the output shaft of the electric motor which is then itself oriented with its shaft in the transport direction of the tilt tray sorter conveyor.

A position generator on the motor is intended to determine the position of the carrying tray continuously, and an electric brake on the motor is intended to be capable of holding the carrying tray in the position provided. Alternatively, a self-locking gear may ensure hold in the predetermined position after the motor has been switched off.

Additional monitoring functions of the traction means may give information on their status and thus indicate the time point at which maintenance measures are to be carried out.

The invention is advantageous because, by simple means, using standard parts, on the one hand, it keeps costs low and, on the other hand, as a result of the flexible traction means used, it reduces noise emissions to a minimum. The simple and easily understood solution lowers the procurement and operating costs, such as electricity and maintenance costs, and therefore makes a beneficial contribution to energy saving.

The scalability of the system enables a product family to be produced for different applications (from the lightweight mail sector to sorting systems for airport baggage) and thus adds to the techniques available commercially.

BRIEF DESCRIPTION OF THE DRAWINGS

An exemplary embodiment of the invention is illustrated in the drawing and is described below. In the drawing.

DETAILED DESCRIPTION OF INVENTION

Figure 1:
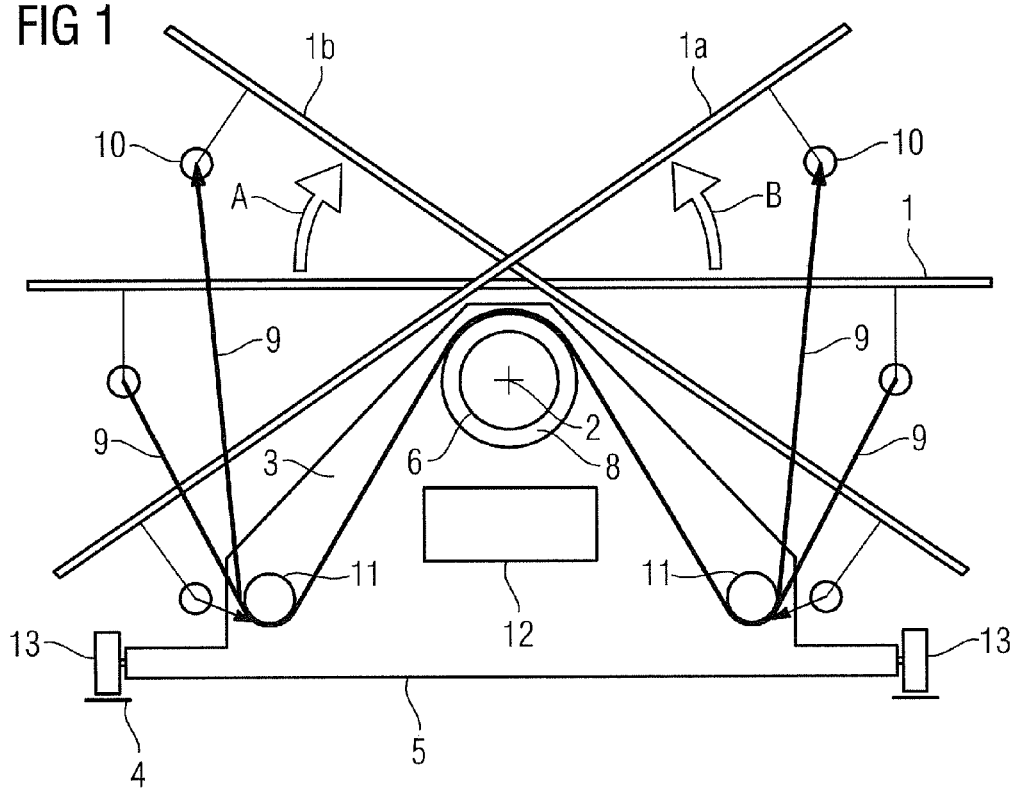
FIG. 1 shows a roughly diagrammatic illustration of the operating principle of the carrying tray in its tilting position.

FIG. 1 illustrates at 1 the carrying tray of a tilt tray sorter conveyor in the transport position (the initial position), in which the carrying tray 1 is fixed in the horizontal position in which an article laid on it can be transported to the destination. The carrying tray 1 is mounted on both sides about a tilt axis 2 (running perpendicularly with respect to the drawing plane) on a bearer 3 which is part of a wagon 5 movable on running rails 4. For pivoting the carrying tray 1 about the tilt axis 2, a drive is provided which is composed of a drive motor 6 and of a gearwheel 8 arranged on its motor shaft 7 and having the traction means, the toothed belt 9, guided over it. As shown in FIG. 1, the toothed belt 9 is articulated at 10 on the underside of the carrying tray 1 on both sides of the longitudinal mid-plane of the wagon 5, the toothed belt 9 being guided from one articulation 10 to the other via the deflecting rollers 11 and the toothed disk 8. When the motor 6 is driven in one direction of rotation or the other, the carrying tray 1 is tilted in the direction of the arrow A or B as soon as the traction forces are applied to the toothed belt from the gearwheel 8. In the drawing figure, the two tilting positions of the carrying tray to the right and to the left are designated by 1a and 1b, and the run of the toothed belt 9 in the two toothing positions can likewise be seen. The motor 6 is activated via the controller which is carried on the wagon 6 and is designated by 12.

Figure 2:
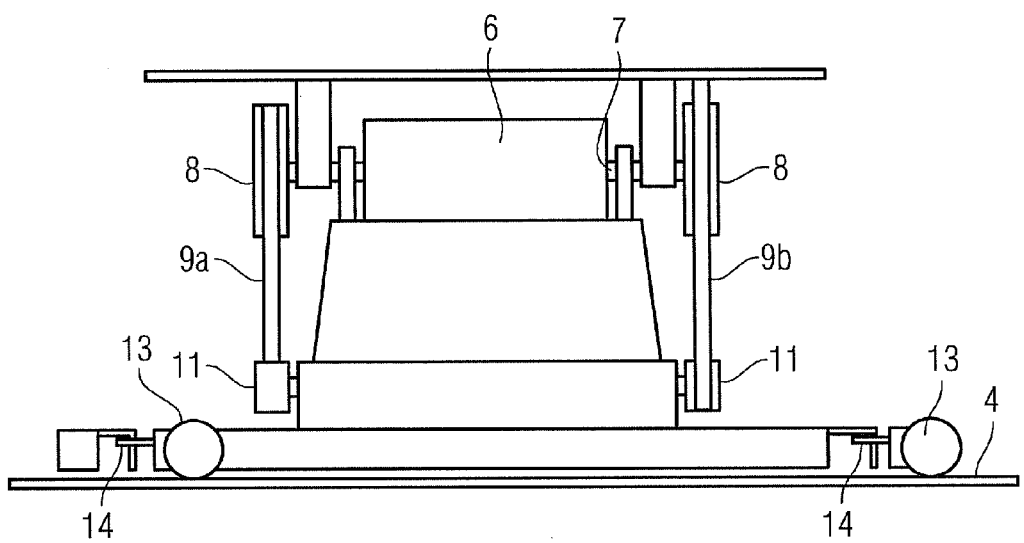
FIG. 2 shows, likewise roughly diagrammatically, a side view of the wagon with the carrying tray.

FIG. 2 illustrates the described components of the invention in a side view. As can be seen, the transmission of the tilting force is portioned to two toothed belts 9a and 9b which are driven in each case by gearwheels 8 which are arranged on both sides on the motor shaft 7 of the motor 6. Correspondingly, the deflecting wheels 11 are also arranged at both ends of the wagon 6, so that a symmetrical introduction of force into the tilting drive of the carrying trays 1 takes place.

The carrying rails 4, on which the wagon can be moved on wheels, can be seen in FIG. 2. It is also indicated how the wagon 6 is coupled 14 to the adjacent wagons 6 to form a closed wagon chain.

Figure 3:
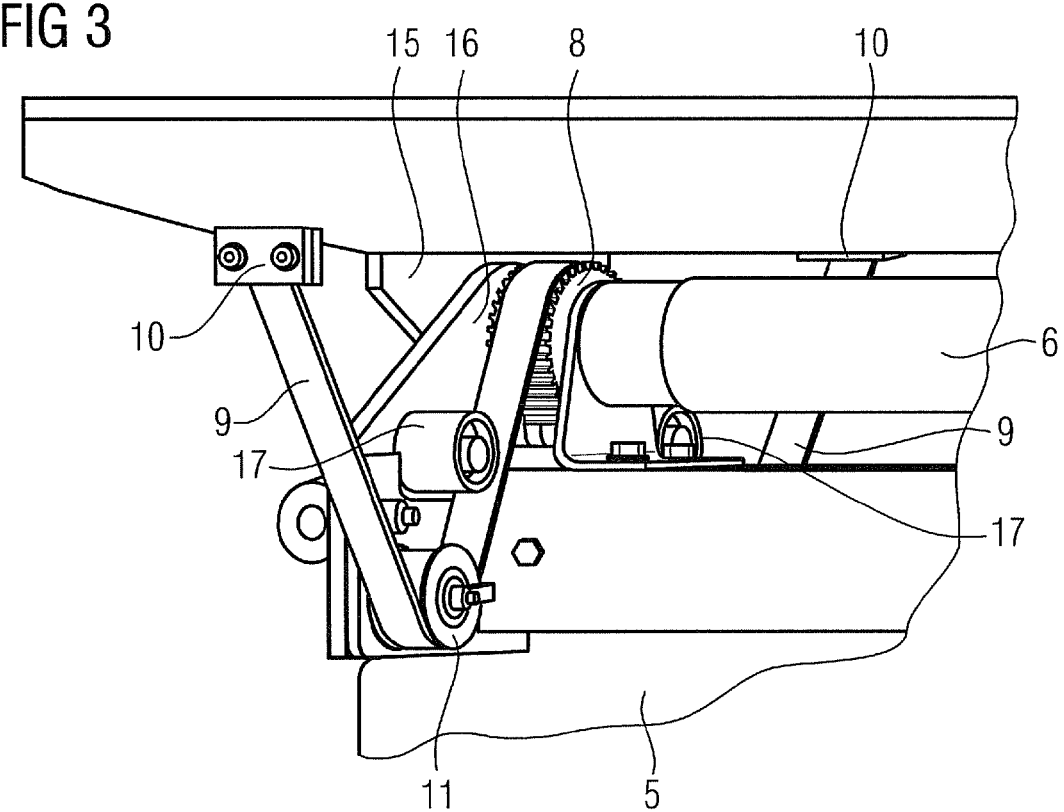
FIG. 3 shows a perspective illustration of the tilting drive in one version of the invention.

FIG. 3 illustrates diagrammatically the details of the tilting drive in a perspective illustration of the wagon 5. The same parts are designated identically. As can be seen, the toothed belt 9 is fastened at 10 to the carrying tray 1 or its underside and is guided from there via the deflecting roller 11 to the gearwheel 8. The toothed belt 9, which engages into the gearwheel 8, loops around the latter and is guided to the other side of the vertical mid-planes of the wagon 5, where, in a symmetrical arrangement, a second deflecting roller 11 guides the toothed belt to the fastening 10 on the other underside of the carrying tray 1. The motor 6 is mounted on the wagon 5 at 16. In the embodiment illustrated, the motor 6 is configured as a drum motor, on the shaft stub of which the gearwheel 8 for the toothed belt 9 is mounted. The axis of rotation of the motor 6 coincides with the tilt axis 2 (FIG. 1) of the carrying tray which is mounted on the crossmember 15. At 17, additional deflecting rollers are illustrated which serve for guiding the toothed belt 9 in the tilted position of the carrying tray 1. These rollers 17 or the deflecting rollers 11 may in each case be mounted resiliently, in order to compensate length differences during the tilting of the carrying tray 1.

Figure 4:
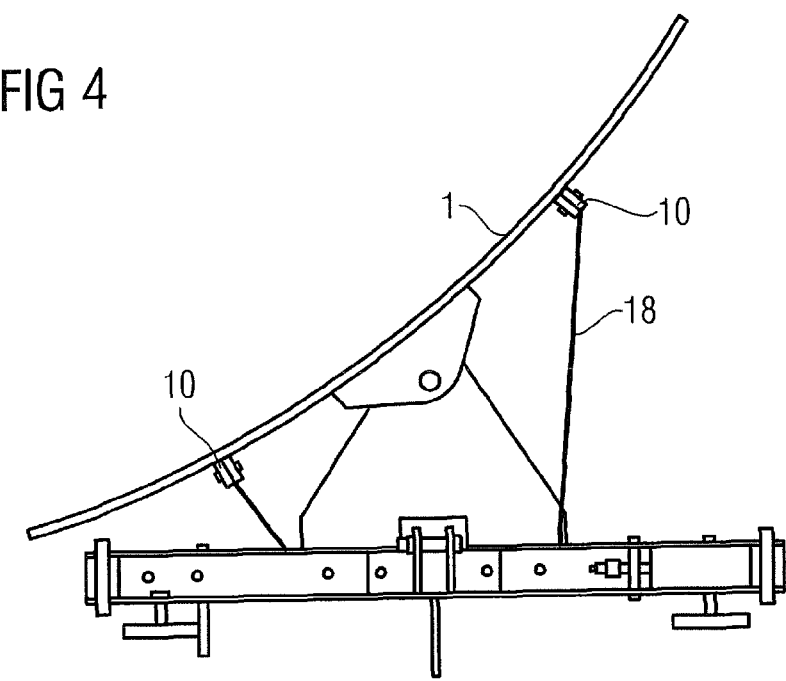
FIG. 4 shows a view of a wagon with a tilted carrying tray in the transport direction of the tilt tray sorter conveyor.

In a preferred other embodiment of the invention, instead of one or two toothed belts 9, a strap 18 is used which corresponds essentially to the width of the carrying tray 1, as seen in the transport direction. The strap 18 is guided around a deflecting drum 19 around which it is looped frictionally. FIG. 4 illustrates the left-tilted position of the carrying tray 1 in a view pointing in the transport direction of the tilt tray sorter conveyor. Like the toothed belt 9 in FIG. 3, the strap 18 is fastened on both sides of the tilt axis 2 to the underside of the carrying tray 1 and is capable of converting the torque applied by the deflecting drum 19 into a traction force upon the traction means designed as a strap 18.

Figure 5:
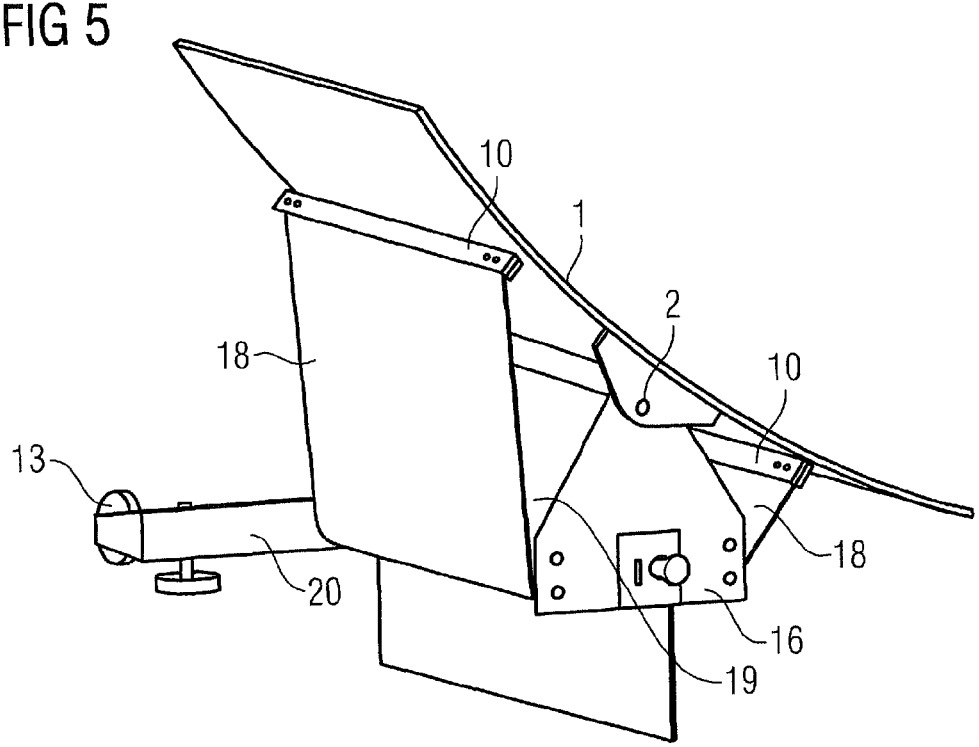
FIG. 5 shows a perspective illustration of the tilted carrying tray in a second embodiment of the invention.

Frame parts 20 of the wagon 5 and the crossmember 15 of the carrying tray 1 with its articulation on the tilt axis 2 of the system can be seen in FIG. 5 which is a perspective illustration of the variant according to the invention. In this solution, as can be seen, the lower side region of the carrying tray 1 is closed off, thus preventing parts of piece goods from being trapped in the system and blocking or damaging this.

The invention claimed is:

1. A tilt tray sorter conveyor for piece goods, comprising:
   a plurality of wagons which are coupled to one another into a ring or train or are individual and are movable along running rails, each wagon having a carrying tray arranged thereon,
   a tilting drive arranged on each wagon, wherein the carrying trays are pivoted for a discharge of conveyable stock transported lying on the carrying tray by the tilting drive, the carrying trays being pivoted out of a horizontal transport position, about a tilt axis running in a direction of travel and arranged centrally underneath the carrying tray, on both sides in each case into an unloading position,
   wherein the tilting drive comprises at least one flexible non-positive or positive traction unit having first and second ends each attached to respective attachments located on opposed sides of the carrying tray wherein the tilt axis is located between the first and second ends and wherein the traction unit is operatively connected to a drive for applying a traction force via the traction unit to the carrying tray to cause tilting of the carrying tray about the tilt axis, at least one deflection roller fixedly positioned at one side of the drive to rotatingly guide the traction unit and deflect the traction force conveyed by the traction unit to the carrying tray as the traction unit travels around the deflecting roller between the respective attachments on the opposed sides of the carrying tray to cause the tilting of the carrying tray.

2. The tilt tray sorter conveyor as claimed in claim 1, wherein the traction unit is connected positively to the drive and is driven as chain or toothed belt via a chain wheel or gearwheel, an axis of rotation of the chain wheel or gearwheel being oriented in the transport direction.

3. The tilt tray sorter conveyor as claimed in claim 1, wherein the traction unit is connected non-positively to the drive and is guided as a belt around a pulley, an axis of rotation of the pulley being oriented in the transport direction.

4. The tilt tray sorter conveyor as claimed in claim 1, wherein the non-positive traction unit is a strap
   which has a width corresponding essentially to a width of the carrying tray as seen in the transport direction,
   which is guided underneath the carrying tray via a drive drum, an axis of rotation of the drive drum being oriented in the transport direction, and
   which is articulated at ends of the strap on both sides, above the drive drum, on the underside of the carrying tray.

5. The tilt tray sorter conveyor as claimed in claim 1, wherein the traction unit is guided around deflecting rollers on both sides of the drive.

6. The tilt tray sorter conveyor as claimed in claim 5, wherein, between the deflecting rollers and an articulation of the traction unit, tension rollers are mounted resiliently in a resulting direction of action of traction forces.

7. The tilt tray sorter conveyor as claimed in claim 5, wherein the deflecting rollers are designed as tension rollers.

8. The tilt tray sorter conveyor as claimed in claim 6, wherein the deflecting rollers are designed as tension rollers.

9. The tilt tray sorter conveyor as claimed in claim 5, wherein the traction unit is guided from one side of the carrying tray to the other side of the carrying tray in an S-shaped manner around the deflecting rollers and the drive.

10. The tilt tray sorter conveyor as claimed in claim 1, wherein, at least in the case of the non-positive fraction unit, a looping angle of the traction unit around the drive is between 45° and 180°.

11. The tilt tray sorter conveyor as claimed in claim 5, wherein the deflecting rollers are arranged at a lower level than the drive.

12. The tilt tray sorter conveyor as claimed in claim 1, wherein the drive is fed from an electric motor.

13. The tilt tray sorter conveyor as claimed in claim 12, wherein the electric motor is provided with a pulse generator for determining a position of the carrying tray.

14. The tilt tray sorter conveyor as claimed in claim 1, wherein each carrying tray is pivoted by the tilting drive including a control unit in a directed manner out of the horizontal into any position between the horizontal transport position and an unloading position and is fixable temporarily in each of these positions.

15. The tilt tray sorter conveyor as claimed in claim 14, wherein the carrying tray is held in a predetermined position via an electric brake.

16. The tilt tray sorter conveyor as claimed in claim 14, wherein the carrying tray is held in a predetermined position via a self-locking gear between a motor and gearwheel.

\* \* \* \* \*